United States Patent [19]
Prinz et al.

[11] 3,988,390
[45] Oct. 26, 1976

[54] THERMOPLASTIC POLYCARBONATE MOULDING COMPOSITIONS

[75] Inventors: Richard Prinz, Leverkusen; Salah Elabd Elghani, Cologne; Winfried Fischer, Cologne; Heinrich Alberts, Cologne, all of Germany

[73] Assignee: Bayer Aktiengesellschaft, Germany

[22] Filed: Aug. 12, 1975

[21] Appl. No.: 604,009

Related U.S. Application Data
[62] Division of Ser. No. 465,688, April 30, 1974.

[30] Foreign Application Priority Data
May 4, 1973 Germany............................ 2322435

[52] U.S. Cl............................ 260/873; 260/878 R; 204/159.14
[51] Int. Cl.²........................................ C08L 67/06
[58] Field of Search....................... 260/873, 878 R

[56] References Cited
UNITED STATES PATENTS

| | | | |
|---|---|---|---|
| 3,164,651 | 1/1965 | Chu.................................. | 260/33.4 R |
| 3,597,498 | 8/1971 | Christensen ......................... | 260/873 |
| 3,855,353 | 12/1974 | Alberts et al. .................. | 260/878 R |

*Primary Examiner*—Richard B. Turer
*Attorney, Agent, or Firm*—Connolly and Hutz

[57] ABSTRACT

Thermoplastic moulding compositions comprising
1. 5–95 % by weight of polycarbonates of divalent phenols
2. 95–5 % by weight of graft copolymers of
   a. at least one aromatic monovinyl compound
   b. acrylonitrile and/or its derivatives
   c. optionally a vinyl or allyl compound on ethylene/vinyl acetate copolymers.

9 Claims, No Drawings

THERMOPLASTIC POLYCARBONATE MOULDING COMPOSITIONS

CROSS REFERENCE TO RELATED APPLICATION

This application is a division of application Ser. No. 465,688 filed Apr. 30, 1974.

This invention relates to thermoplastic moulding compositions comprising:
1. 5 – 95%, by weight, by polycarbonates of divalent phenols and
2. 95 – 5%, by weight, of graft copolymers of
   a. at least one aromatic monovinyl compound,
   b. acrylonitrile and/or its derivatives and
   c. optionally a vinyl or allyl compound grafted on to ethylene/vinyl acetate copolymers.

The moulding compositions of the present invention have greatly improved flow properties compared with polycarbonates. Their mechanical properties are, in some instances, better than those of their components, indicating surprising synergistic effects.

The moulding compositions of the present invention also have a substantially better tracking resistance than do polycarbonates.

The moulding compositions of the present invention may be processed within a wider temperature range and have greater weather resistance than the conventional mixtures of polycarbonates and graft polymers of styrene and acrylonitrile on polybutadiene.

Suitable polycarbonate components, (1) for use in the moulding compositions are high molecular weight thermo-plastic polycarbonates obtained from divalent phenols, e.g. from hydroquinone, resorcinol, 4,4'-dihydroxy-diphenyl, bis-(4-hydroxyphenyl)-alkanes, -cycloalkanes, -ethers,-sulphides, -sulphones or -ketones, bisphenols in which the nuclei are halogenated or alkylated and $\alpha,\alpha'$-bis-(p-hydroxyphenol)-p-diisopropylbenzene. Polycarbonates based on 4,4'-dihydroxy-2,2-diphenylpropane, (bisphenol A), tetrachlorobisphenol A, tetrabromobisphenol A, tetramethylbisphenol A and trinuclear bisphenols, e.g. $\alpha,\alpha'$-bis-(4-hydroxyphenyl)-p-diisopropylbenzene are preferred. The polycarbonates may be obtained from the phenols in known manner by reacting them with polycarbonate forming derivatives of carbonic acid, for example phosgene. Polycarbonates of this kind are known and have been described in U.S. Pat. Nos. 3,028,365; 2,999,835; 3,148,172; 3,271,368; 2,970,137; 2,991,273; 3,271,367; 3,280,078; 3,014,891 and 2,999,846.

It is preferred to use polycarbonates with molecular weights of from about 10,000 to 100,000, preferably from 20,000 to 60,000, having a relative viscosity of from 1.2 to 1.6, determined using a solution of 0.5 g polycarbonate in 100 ml methylene chloride at 25° C.

The graft polymerisation component, (2), used in the moulding compositions is prepared by polymerising a monomer combination of
   a. at least one aromatic monovinyl compound,
   b. acrylonitrile and/or its derivatives and
   c. optionally a vinyl or allyl compound in the presence of ethylene/vinyl acetate copolymers.

Graft polymers in which at least 75% of the ethylene/vinyl acetate copolymer is grafted are preferred and those which are at least 90% grafted are particularly preferred.

The preparation of such products has been described in German Offenlegungsschriften 2,215,588 and 2,305,681.

Graft polymers obtained from the following reactants are particularly suitable for use as components of the moulding compositions of the present invention:
1. 10–70%, by weight, preferably 15–25%, by weight, of an ethylene/vinyl acetate copolymer in which 25–75%, by weight, preferably 30 to 55%, by weight, of vinyl acetate has been incorporated by polymerisation as graft stock, and
2. 90–30%, by weight, preferably 85–75%, by weight, of a copolymer prepared, in the presence of (1), from:
   2.1. 15–85 parts, by weight, preferably 20–50 parts, by weight, acrylonitrile, methacrylonitrile or mixtures thereof,
   2.2. 10–85 parts, by weight, preferably 80 to 50 parts, by weight, styrene, $\alpha$-methylstyrene or mixtures thereof,
   2.3 0.1–20 parts, by weight, preferably 0.1–5 parts, by weight, of at least one monoolefin,
   2.4. 0–20 parts, by weight, preferably 0–5 parts, by weight, of at least one other vinyl compound, and
   2.5. 0–10 parts, by weight, preferably 0–5 parts, by weight, of at least one allyl compound.

Constituents (2.4) and (2.5) may generally be omitted but may be used to achieve special effects.

The graft polymers may be obtained by dissolving ethylene/vinyl acetate copolymers, e.g. using t-butanol as solvent, and then adding the graft monomers, for example styrene and acrylonitrile, and an $\alpha$-olefin as molecular weight regulator and then initiating polymerisation by the addition of a free-radical catalyst. After heating, when polymerisation has been completed, the polymer is finally isolated by steam distillation.

The monoolefin (2,3) used as molecular weight regulators are preferably $C_2$-$C_{18}$-monoolefins having one terminal double bond. propylene and isobutylene are examples.

Instead of carrying out a simple solution polymerisation, polymerisation may also first be carried out in a reverse emulsion, i.e. in which water is emulsified in the monomer-polymer mixture, and, when a certain proportion of monomer has been converted, the reverse emulsion may be converted into a suspension of prepolymer by further addition of water and polymerisation may then be carried to completion in this suspension.

It is often advantageous to carry out an additional cross-linking reaction of the graft copolymer after polymerisation, for example by means of oxides, e.g. dit-butyl peroxide or dicumyl peroxide, or by irradiation with actinic radiation.

The moulding compositions according to the invention are generaly obtained from the polycarbonates and graft copolymers by vigorous mixing. Any conventional mixing processes may be used for this purpose; preferably, the constituents of the moulding composition, mixed in the required proportions, are extruded together through a screw extruder.

Alternatively, solutions of the two components of the moulding composition may be mixed in a solvent which is suitable for both. Suitable solvents include chlorinated aliphatic and aromatic hydrocarbons, e.g. chloroform and chlorobenzene. The moulding compositions may then be isolated from the solutions by evaporation of the solvent or by precipitation with non-solvents.

Suitable non-solvents include alcohols, e.g. methanol, ethanol and isopropanol.

The moulding compositions according to the invention are suitable for producing any kind of moulded products as well as films and threads.

In the following Examples, the parts and percentages are calculated by weight.

EXAMPLES

A. Preparation of styrene/acrylonitrile graft copolymer

A solution is prepared from 7 kg of an ethylene/vinyl acetate copolymer which has a vinyl acetate content of 45%, by weight, (melt index at 190°C: 3.6), 21 kg styrene, 7 kg acrylonitrile, 1.05 kg allyl acetate and 60 kg t-butanol in a 125 l autoclave under a stream of nitrogen. 2.2 kg propylene are pumped into this solution. A solution of 102 g dibenzoyl peroxide in 1.05 kg allyl acetate which has been diluted to 2.5 : 1 with t-butanol is then pumped in, with stirring, at 85° C over the period of 5 hours.

The rection mixture is then stirred for 8 hours at 85° C. After cooling, the solvent and residual monomers are removed with steam and the reaction product is dried. 32.5 kg of a graft copolymer are obtained which has an ethylene/vinyl acetate copolymer content of 21.8%, by weight, an acrylonitrile content of 18%, by weight, a styrene content of 59%, by weight, an allyl acetate content of 0.9%, by weight, and a propylene content of 0.3%, by weight, (melt index at 190° C: 0.47). The following mechanical properties were determined:

| | |
|---|---|
| Impact strength according to DIN 53 453 | 78 cmkp/cm² |
| Notched impact strength according to DIN 53 453: | 5 cmkp/cm² |
| Vicat (B) according to DIN 53 460: | 81° C |
| E-modulus according to DIN 53 452: | 22,000 kp/cm² |

B. Preparation of the moulding compositions

EXAMPLE 1

90 parts of a polycarbonate of 4,4'-dihydroxy-2,2-dipheylpropane, having a relative viscosity of 1.28, (determined on a solution of 0.5 g polycarbonate in 100 ml methylene chloride) and 10 parts of a graft copolymer of 56% styrene and 21% acrylonitrile on 23% of an ethylene/vinyl acetate copolymer, containing 45% vinyl acetate, are mixed in a double screw extruder at 180°, 190°, 200° and 210° C and extruded.

Some of the mechanical properties of this moulding composition and of compositions produced in the following Examples are shown in the following Table.

EXAMPLE 2

80 parts of the polycarbonate, as described in Example 1, and 20 parts of the graft copolymer, as described in Example 1, are mixed and extruded in a double screw extruder at the temperatures indicated.

EXAMPLE 3

70 parts of the polycarbonate, as described in Example 1, and 30 parts of the graft copolymer, as described in Example 1, are mixed and extruded in a double screw extruder at the temperatures indicated.

EXAMPLE 4

60 parts of the polycarbonate, as described in Example 1, and 40 parts of the graft copolymer, as described in Example 1, are mixed and extruded in a double screw extruder at the temperatures indicated.

This moulding composition, for example, has a notched impact strength of 50 cmkp/cm² at room temperature according to DIN 53 453 whereas the individual components have a notched impact strength of 33 cmkp/cm² and 5 cmkp/cm², respectively. The above composition has a modulus of flexural elasticity of 24,000 kp/cm² which is higher than that of either of the components.

EXAMPLE 5

50 parts of the polycarbonate, as described in Example 1, and 50 parts of the graft copolymer, as described in Example 1 are mixed and extruded in a double screw extruder at the temperatures indicated.

EXAMPLE 6

40 parts of the polycarbonate, as described in Example 1, and 60 parts of the graft copolymer, as described in Example 1, are mixed and extruded in a double screw extruder at the temperatures indicated.

EXAMPLE 7

80 parts of the polycarbonate, as described in Example 1, and 20 parts of a graft copolymer of 38% styrene and 14% acrylonitrile on 48% of an ethylene/vinyl acetate copolymer, having a vinyl acetate content of 45%, are mixed and extruded in a double screw extruder at the temperatures indicated.

| Property | Test method | Units | Example 1 | 2 | 3 | 4 | 5 | 6 | 7 |
|---|---|---|---|---|---|---|---|---|---|
| Impact strength RT | DIN 53453 | cmkp/cm² | unbroken | unbroken | unbroken | unbroken | unbroken | unbroken | unbroken |
| −40° C | | | unbroken | unbroken | unbroken | unbroken | unbroken | unbroken | unbroken |
| Notched impact strength | DIN 53453 | cmkp/cm² | | | | | | | |
| RT | | | | 44 | 58 | 50 | 50 | 50 | 50 | 40 |
| −40° C | | | | 7 | 6 | 5 | 5 | 5 | 5 | |
| Flexural strength 6 bF | DIN 53452 | kp/cm² | 1015 | 1010 | 1000 | 985 | 970 | 980 | |
| Sagging(f) | DIN 53452 | mm | 5.8 | 5.7 | 5.4 | 5.3 | 5.3 | 5.0 | |
| Modulus of flexural elasticity | DIN 53452 | kp/cm² | 23000 | 23200 | 23300 | 24000 | 24000 | 24000 | |
| Ball indentation hardness $H_k 30$ | Provisional standard DIN 53456 | kp/cm² | 1000 | 1010 | 990 | 950 | 900 | 940 | |
| Dimensional | | | | | | | | | |

-continued

| Property | Test method | Units | Example 1 | 2 | 3 | 4 | 5 | 6 | 7 |
|---|---|---|---|---|---|---|---|---|---|
| stability under heat according to Vicat (B) | DIN 53460 | °C | 148 | 142 | 132 | 118 | 113 | 113 | |
| Melt index MFI at 260° C- 21.6 kp | DIN 53735 (E) | g/10 min | 100 | 100 | 154 | 245 | 315 | 345 | |

We claim:
1. A thermoplastic moulding composition comprising
   i. from 5 to 95% by weight of at least one polycarbonate derived from a divalent phenol and
   ii. from 95 to 5% by weight of at least one graft copolymer comprising
      a. from 10 to 70% by weight of an ethylene/vinyl acetate copolymer containing from 25 to 75% by weight of vinyl acetate having grafted thereon
      b. from 90 to 30% by weight of a copolymer prepared from a monomer mixture comprising
         1. from 15 to 85 parts by weight of acrylonitrile, methacrylonitrile or a mixture thereof,
         2. from 10 to 85 parts by weight of styrene, α-methylstyrene or a mixture thereof and
         3. from 0.1 to 20 parts by weight of at least one monoolefin.
2. A thermoplastic moulding composition as set forth in claim 1 wherein (a) is 15 to 25% by weight of an ethylene/vinyl acetate copolymer containing from 25 to 75% by weight of vinyl acetate and (b) is from 85 to 75% by weight of a copolymer prepared from a monomer mixture comprising from 20 to 50 parts by weight of (1), from 80 to 50 parts by weight of (2) and from 0.1 to 5 parts by weight of (3).
3. A composition as claimed in claim 1 in which the said polycarbonate is derived from a divalent phenol selected from the group consisting of hydroquinone, resorcinol, 4,4'-dihydroxy-diphenyl, bis-(4-hydroxyphenyl)-alkanes, -cycloalkanes, -ethers, -sulphides, -sulphones or -ketones, halogen or alkyl substituted bisphenols, α,α'-bis-(p-hydroxyphenyl)-p-diisopropylbenzene, bisphenol A, tetrachloro-bisphenol A, tetrabromo-bisphenol A, tetramethyl-bisphenol A and α,α'-bis-(4-hydroxyphenyl)-p-diisopropylbenzene.
4. A composition as claimed in claim 1 in which the said polycarbonate has a molecular weight of from 10,000 to 100,000.
5. A composition as claimed in claim 4 in which the said molecular weight is from 20,000 to 60,000.
6. A composition as claimed in claim 1 in which the said polycarbonate component has a relative viscosity of from 1.2 to 1.6, determined by using a solution of 0.5 g polycarbonate in 100 ml methylene chloride at 25°C.
7. A composition as claimed in claim 1 in which at least 75 % of the said etylene/vinyl acetate copolymer is grafted.
8. A composition as claimed 7 in which the said copolymer is at least 90 % grafted.
9. A composition as claimed in claim 1 in which the said monoolefin is ethylene or isobutylene.

* * * * *